United States Patent
Ye et al.

(10) Patent No.: US 9,923,451 B2
(45) Date of Patent: Mar. 20, 2018

(54) METHOD AND APPARATUS FOR FILTERING A RECTIFIED VOLTAGE SIGNAL

(71) Applicant: Futurewei Technologies, Inc., Plano, TX (US)

(72) Inventors: Liming Ye, Frisco, TX (US); Heping Dai, Plano, TX (US); Dianbo Fu, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 17 days.

(21) Appl. No.: 15/095,885

(22) Filed: Apr. 11, 2016

(65) Prior Publication Data

US 2017/0294830 A1    Oct. 12, 2017

(51) Int. Cl.
*H02M 1/14* (2006.01)
*H02M 7/06* (2006.01)
*G05F 5/00* (2006.01)

(52) U.S. Cl.
CPC ............... *H02M 1/14* (2013.01); *G05F 5/00* (2013.01); *H02M 7/066* (2013.01)

(58) Field of Classification Search
CPC ............ H02M 1/14; H02M 1/15; H02M 1/12; H02M 1/126; H02M 1/143; H02M 2001/0016; H02M 2001/0022; H02M 2001/12; H02M 1/4266; H02M 7/06; H02J 3/01

See application file for complete search history.

(56) References Cited

U.S. PATENT DOCUMENTS

| | | | |
|---|---|---|---|
| 7,760,524 B2 * | 7/2010 | Matthews | H02M 1/10 363/45 |
| 9,597,964 B2 * | 3/2017 | Lee | B60L 11/18 |
| 9,602,009 B1 * | 3/2017 | Baurle | H02M 1/10 |
| 2014/0126253 A1 * | 5/2014 | Humphrey | H02M 1/44 363/44 |
| 2015/0280582 A1 * | 10/2015 | Fuma | H02M 3/33507 363/21.02 |
| 2016/0294300 A1 * | 10/2016 | Sakakibara | H02M 1/15 |
| 2017/0070082 A1 * | 3/2017 | Zheng | H02M 3/156 |
| 2017/0070136 A1 * | 3/2017 | Buthker | H02M 1/12 |

* cited by examiner

*Primary Examiner* — Kyle J Moody
(74) *Attorney, Agent, or Firm* — Futurewei Technology, Inc.

(57) ABSTRACT

A configurable impedance circuit is provided, including a filter for filtering a received DC voltage and a controller. The filter includes a first capacitor, a second capacitor, and a selectable switch coupled in series with the second capacitor and coupled to receive a control signal. The selectable switch and the second capacitor are selectively coupled in parallel with the first capacitor. The controller is connected to sense a differential voltage across the second capacitor and configured to generate the control signal to open or close the selectable switch based on the differential voltage across the second capacitor, so as to maintain a voltage range across the second capacitor. According to disclosure of the present invention, the total physical size of the capacitors is reduced and the size of the power supply is reduced accordingly.

16 Claims, 3 Drawing Sheets

FIG. 7 ated voltage signal to produce a rectified voltage signal. The configurable impedance circuit is coupled to receive and filter the rectified voltage signal to produce a filtered DC voltage signal, and perform operation as described in the first aspect. The DC/DC converter is coupled to receive the filtered DC voltage signal, to convert the filtered DC voltage signal from a first DC voltage level signal to a second DC voltage level signal and to provide the second DC voltage level signal to a load.

METHOD AND APPARATUS FOR FILTERING A RECTIFIED VOLTAGE SIGNAL

TECHNICAL FIELD

The present invention relates generally to a method and apparatus used for a power supply, and, in particular, to a method and apparatus for filtering a rectified voltage signal.

BACKGROUND

Figure 1:
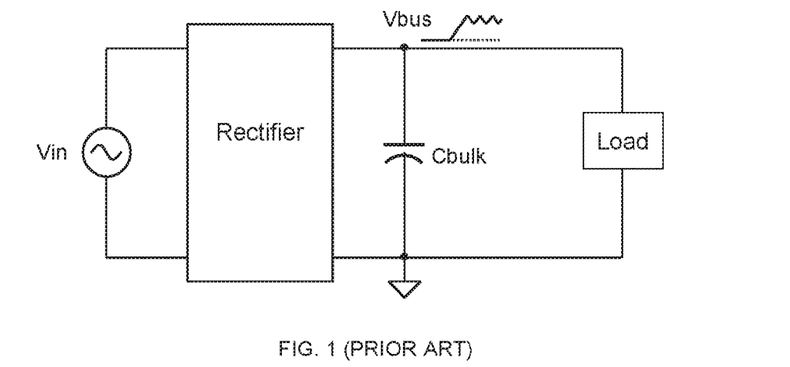
FIG. 1 illustrates a prior art power supply.

An alternating current to direct current (AC-to-DC) power supply is widely used to convert an alternating current (AC) voltage signal to a direct current (DC) voltage signal to provide power to a load. As illustrated in FIG. 1, a prior art power supply includes a rectifier and a bulk capacitor. The rectifier rectifies an AC voltage signal received from an AC power source into a rectified DC voltage signal that flows in only one direction. The bulk capacitor receives and filters the rectified voltage to produce a DC voltage with reduced ripple and provides the DC voltage signal to a load.

The DC voltage provided to the load may need to stay in regulation for a certain amount of time after the AC power source is removed or fails. The amount of time the power supply continues to regulate after the AC power source is removed is referred to as hold-up time. During the hold-up time, the bulk capacitor operates to provide the necessary temporary power for the load as it discharges. In most AC-to-DC power supplies the minimum hold-up time is required to be the time necessary to maintain voltage regulation for at least one missing AC cycle of the AC power source.

In order to provide a desired DC voltage signal in different countries, the AC-to-DC power supplies are configured to operate for a wide range of AC input voltage signals. Therefore, bulk capacitors having a large volume are needed due to the high capacitance values demanded by the minimum AC input voltage combined with very high voltage ratings demanded by the maximum AC input voltage. Not only is the size of such bulk capacitors large, their cost is also relatively high. Since a physical size and a cost of the power supply are strongly influenced by the cost and size of the bulk capacitor, the conventional power supply is bulky in size and also costly.

SUMMARY OF THE INVENTION

It is an object of the application to provide an improved concept for filtering a rectified voltage signal.

In a first aspect, a configurable impedance circuit is provided. The configurable impedance circuit includes a filter for filtering a received DC voltage and a controller. The filter includes a first capacitor, a second capacitor, and a selectable switch coupled in series with the second capacitor and coupled to receive a control signal. The selectable switch and the second capacitor are selectively coupled in parallel with the first capacitor. The controller is connected to sense a differential voltage across the second capacitor and configured to generate the control signal to open or close the selectable switch based on the differential voltage across the second capacitor, so as to maintain a voltage range across the second capacitor.

In a second aspect, a power supply is provided. The power supply includes a rectifier, a configurable impedance circuit of the first aspect, and a DC/DC converter. The rectifier is configured to receive an AC voltage and rectify the AC volt- By utilizing a topology that includes the first capacitor and the selectable second capacitor, the total physical size of the capacitors is reduced and the size of the power supply is reduced accordingly.

In addition, since the differential voltage across the second capacitor is maintained between the first and second threshold voltages, the selectable switch with a relatively low voltage rating can be used in the power supply, which reduces the size and/or the cost of the switch and further reduces the size and/or the cost of the power supply.

In some implementations, the controller may generate the control signal in a first state, e.g., a low level, to open the selectable switch in response to the differential voltage across the second capacitor rising to a first threshold voltage of the voltage range. The controller may generate the control signal in a second state, e.g., a high level, to close the selectable switch in response to the differential voltage across the second capacitor dropping to a second threshold voltage of the voltage range.

In some implementations, the controller may include a comparing module and a signal generator. The comparing module is coupled to receive a first voltage signal from a first node connected to the first and second capacitors, and further coupled to receive a second voltage signal from a second node connected to the second capacitor and the selectable switch coupled in series with the second capacitor. A difference between the first voltage signal and the second voltage signal indicates the differential voltage across the second capacitor. The comparing module is configured to compare the differential voltage with first and second threshold voltages in one embodiment. The signal generator is configured to generate the control signal based on the comparison. For example, the switch is opened whenever the differential voltage is greater than or equal to the first threshold voltage and the switch is closed whenever the differential voltage is less than or equal to the second threshold voltage.

In some implementations, the comparing module may include a first voltage divider, a second voltage divider, and a comparator. The first voltage divider is coupled to receive the first voltage signal and generates a first input signal indicative of the first voltage signal. The second voltage divider is coupled to receive the second voltage signal and generates a second input signal indicative of the second voltage signal. The comparator is coupled to receive the first input signal at a first input end, receive the second input signal at a second input end, and compares the first input signal and the second input signal. For example, the comparator comprises a Schmitt trigger in one embodiment.

In some implementations, the signal generator may adjust the control signal in a first state to open the selectable switch if the first input signal is greater than the second input signal, and adjust the control signal in a second state to close the selectable switch if the first input signal is less than or equal to the second input signal.

In some implementations, the values of the first and second threshold voltages are determined based on a configuration of the first voltage divider.

In some implementations, the filter may further include a diode coupled in parallel with the selectable switch. The diode may adjust the differential voltage to be equal to the rectified voltage signal if the rectified voltage signal drops below the differential voltage.

In a third aspect, a method for filtering a rectified voltage signal is provided. The rectified voltage signal is filtered with a first capacitor. A differential voltage across a second capacitor is sensed. The second capacitor is coupled in series with a selectable switch, and the selectable switch and the second capacitor are selectively coupled in parallel with the first capacitor. A control signal is generated based on the differential voltage across the second capacitor in relation to first and second threshold voltages. The selectable switch is switched according to the control signal, so as to maintain a voltage range within the first and second threshold voltages across the second capacitor.

In some implementations, the control signal may be generated in a first state, e.g., a low level, in response to the differential voltage across the second capacitor rising to a first threshold voltage of the voltage range, and the selectable switch may be opened in response to the control signal being in the first state. The control signal may be generate in a second state, e.g., a high level, in response to the differential voltage across the second capacitor dropping to a second threshold voltage of the voltage range, and the selectable switch may be closed in response to the control signal being in the second state.

In some implementations, the differential voltage may be adjusted to be equal to the rectified voltage signal if the rectified voltage signal drops below the differential voltage.

Present application provides an improved concept for filtering a rectified voltage signal. By implementing the solution in a filtering process, the total physical size of the capacitors is reduced and the size of the power supply is reduced accordingly.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Embodiments according to the present invention provide a configurable impedance circuit, a power supply including a configurable impedance circuit, and a method for filtering a rectified voltage signal. The configurable impedance circuit includes a filter for filtering a received DC voltage. The controller includes a first capacitor, a second capacitor, and a selectable switch coupled in series with the second capacitor and coupled to receive a control signal. The selectable switch and the second capacitor are selectively coupled in parallel with the first capacitor. The configurable impedance circuit further includes a controller connected to sense a differential voltage across the second capacitor and configured to generate the control signal to open or close the selectable switch based on the differential voltage across the second capacitor, so as to maintain a voltage range across the second capacitor. Advantageously, by utilizing a topology that includes the first capacitor and the selectable second capacitor, the total physical size of the capacitors is reduced and the size of the power supply is reduced accordingly.

Figure 2:
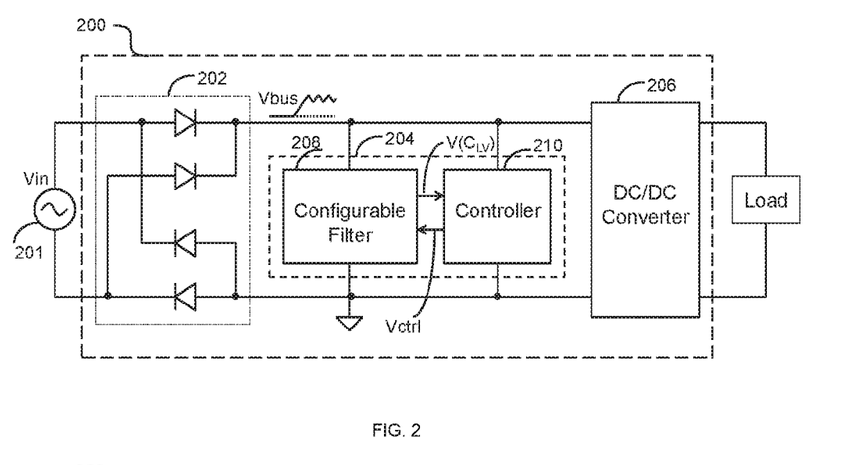
FIG. 2 illustrates a simplified block diagram of a power supply, according to one embodiment of the present invention.

FIG. 2 illustrates a simplified block diagram of a power supply 200, according to one embodiment of the present invention. The power supply 200 can be used to provide power to a load. As illustrated in FIG. 2, the power supply 200 is coupled to receive an alternating current (AC) signal from an AC power source 201. Power supply 200 includes a rectifier 202 that receives the AC signal to produce a rectified signal, a configurable impedance circuit 204 coupled to receive the rectified signal to produce a filtered DC signal and a DC/DC converter 206 coupled to receive the filtered DC signal to produce a DC-to-DC output signal. In the described embodiment, the configurable impedance circuit 204 includes a configurable filter 208 and a controller 210 that are coupled to the output terminals of the rectifier 202.

The AC power source 201 is capable of generating an AC input voltage Vin and providing the AC voltage Vin to the rectifier 202 of power supply 200. The rectifier 202 rectifies the AC input voltage Vin and generates a rectified voltage, labeled Vbus on the figures, to the configurable impedance circuit 204. The rectifier 202 includes a full-wave bridge rectifier in the embodiment of FIG. 2. Any known type of rectifier may be used in place of a full-wave bridge rectifier including, for example, a half-wave rectifier. The configurable impedance circuit 204 receives and filters the rectified voltage Vbus to substantially remove ripple and to produce a filtered DC voltage signal. The DC/DC converter 206 is coupled to receive the filtered DC voltage signal, convert the filtered DC voltage signal from a first DC voltage level signal to a second DC voltage level signal and provide the second DC voltage level signal to the load.

The controller 210 of the configurable impedance circuit 204 is connected to sense a differential voltage across at least one capacitor $V(C_{LV})$ in the configurable filter 208, and is configured to generate a control signal Vctrl based on the differential voltage across the capacitor. In particular, the controller 210 includes logic configured to maintain a voltage range across the capacitor by generating control signals to the configurable filter 208 to control the operation and filter configuration of the configurable filter 208. The detailed operation of the configurable impedance circuit 204 will be described in relation with FIGS. 4-6.

Figure 3:
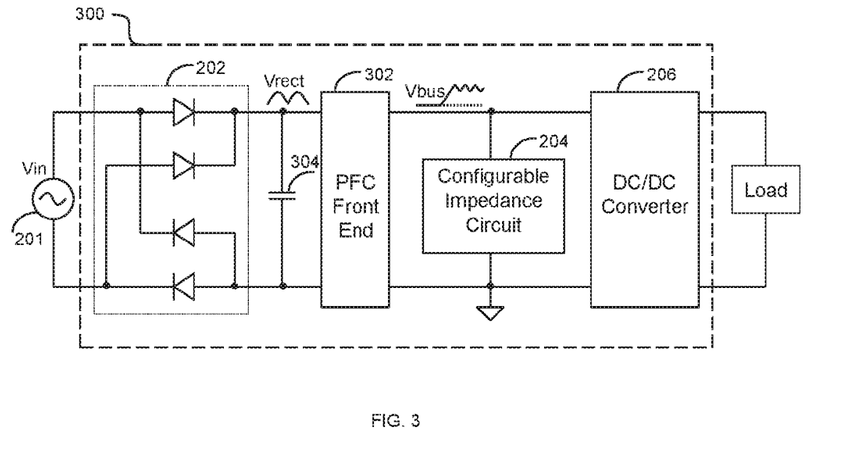
FIG. 3 illustrates a simplified block diagram of a power supply, according to another embodiment of the present invention.

FIG. 3 illustrates a simplified block diagram of a power supply 300, according to one embodiment of the present invention. Elements labeled or numbered the same as in FIG. 2 have similar functions. Commonly labeled or numbered elements won't be described again. In the example shown in FIG. 3, the power supply 300 further includes a capacitor 304 and a power factor correction (PFC) front end 302 coupled between the rectifier 202 and the configurable impedance circuit 204 and configured to reduce or remove a phase difference between current and voltage signals. The capacitor 304 produces a voltage Vrect. The PFC front end 302 is configured to regulate the voltage Vrect to produce the voltage Vbus to satisfy transient response requirements including phase correlation of voltage and current of the power supply.

Figure 4:
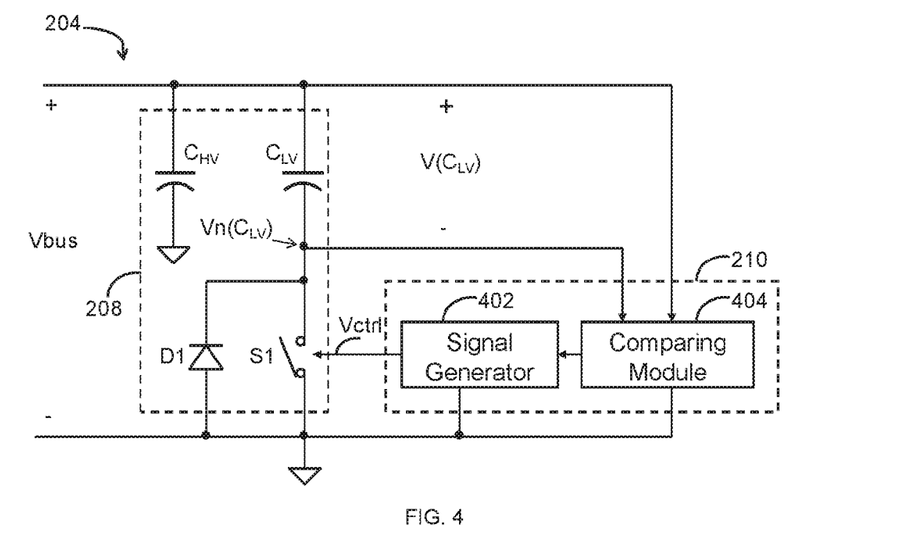
FIG. 4 illustrates a configurable impedance circuit, according to one embodiment of the present invention.

FIG. 4 illustrates a configurable impedance circuit, according to one embodiment of the present invention. Elements labeled or numbered the same as in FIG. 2 have similar functions. Commonly labeled or numbered elements won't be described again. As described, the configurable impedance circuit 204 includes the configurable filter 208 and the controller 210. In the example of FIG. 4, the configurable filter 208 includes a first capacitor $C_{HV}$, a second capacitor $C_{LV}$, a selectable switch S1 coupled in series with the second capacitor $C_{LV}$, and a diode D1 coupled in parallel with the selectable switch S1. The selectable switch S1 is coupled to receive a control signal Vctrl. The selectable switch S1 and the second capacitor $C_{LV}$ are selectively coupled in parallel with the first capacitor $C_{HV}$.

The controller 210 senses a differential voltage $V(C_{LV})$ across the second capacitor $C_{LV}$, and accordingly generates the control signal Vctrl to open or close the selectable switch S1 based on the differential voltage $V(C_{LV})$, so as to maintain a voltage range across the second capacitor $C_{LV}$.

In the example of FIG. 4, the controller 210 includes a comparing module 404 and a signal generator 402. The comparing module 404 is coupled to sense the differential voltage $V(C_{LV})$ by sensing the voltage Vbus and a voltage $Vn(C_{LV})$ at a node connected to the second capacitor $C_{LV}$ and the selectable switch S1. A difference of the voltage Vbus and the voltage $Vn(C_{LV})$ indicates the differential voltage $V(C_{LV})$ across the second capacitor $C_{LV}$. The comparing module 404 compares the differential voltage $V(C_{LV})$ with first and second threshold voltages $V_{THH}$ and $V_{THL}$. The signal generator 402 is configured to generate the control signal based on the comparison.

For example, whenever the differential voltage $V(C_{LV})$ is greater than or equal to the first threshold voltage $V_{THH}$, the signal generator 402 generates the control signal Vctrl in a first state (e.g., a low level) to open the selectable switch S1 to electrically remove the second capacitor $C_{LV}$. The switch S1 remains open until the differential voltage $V(C_{LV})$ reaches or falls below $V_{THL}$. Accordingly, the selectable switch S1 and the second capacitor $C_{LV}$ are not coupled in parallel with the first capacitor $C_{HV}$ while switch S1 is open and only the first capacitor $C_{HV}$ operates to filter the voltage Vbus.

Whenever the differential voltage $V(C_{LV})$ is less than or equal to the second threshold voltage $V_{THL}$, the signal generator 402 generates the control signal Vctrl in a second state (e.g., a high level) to close the selectable switch S1. Accordingly, the selectable switch S1 and the second capacitor $C_{LV}$ are coupled in series and are jointly coupled in parallel with the first capacitor $C_{HV}$. Operationally, when the selectable switch S1 is closed, the second capacitor $C_{LV}$ is coupled in parallel with the first capacitor $C_{HV}$. Therefore, the first capacitor $C_{HV}$ and the second capacitor $C_{LV}$ are configured in a parallel connection to filter the voltage Vbus and the total capacitance for these two capacitors is a sum of their capacitive values. In at least one embodiment, the switch S1 comprises an N-type metal-oxide-semiconductor field-effect transistor (MOSFET) that is an enhancement mode device that is normally off and that closes the connection to allow current flow with a proper gate voltage. The switch S1 remains closed until the differential voltage $V(C_{LV})$ reaches or exceeds $V_{THH}$. The selectable switch S1 is opened and closed alternately according to the differential voltage $V(C_{LV})$ across the second capacitor $C_{LV}$, causing the selectable switch S1 and the second capacitor $C_{LV}$ selectively coupled in parallel with the first capacitor $C_{HV}$.

Figure 5A:
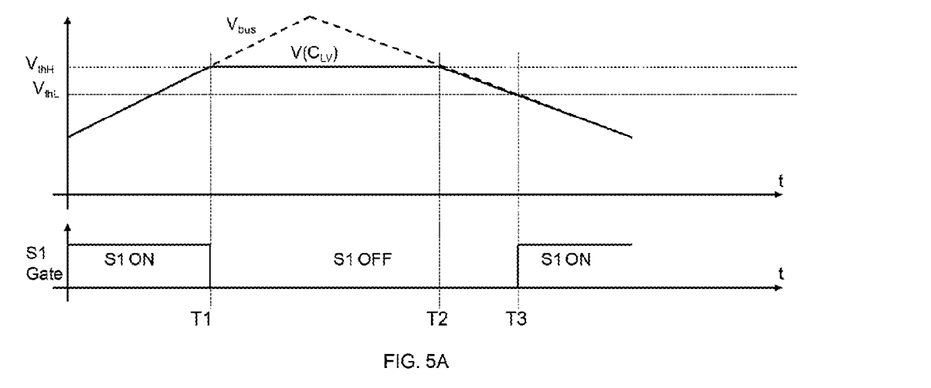
FIG. 5A and FIG. 5B illustrate waveform diagrams of the differential voltage $V(C_{LV})$ and the state of the selectable switch S1.
Figure 5B:
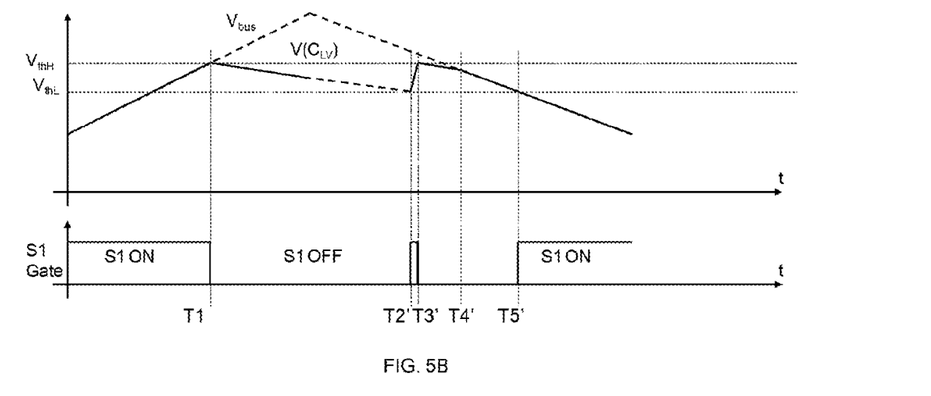

The detailed operations of the configurable filter 208 and the controller 206 will be described in relation to FIG. 5A and FIG. 5B FIG. 5A and FIG. 5B illustrate waveform diagrams of the differential voltage $V(C_{LV})$ and the state of the selectable switch S1 in an ideal situation and in a practical situation, respectively.

In the example of FIG. 5A, when the switch S1 is opened and the diode D1 is in reverse voltage blocking state, it is assumed that no net leakage current is flowing in or out of the voltage node $Vn(C_{LV})$ of the capacitor $C_{LV}$.

When the differential voltage $V(C_{LV})$ is rising and the differential voltage $V(C_{LV})$ is less than the first threshold voltage $V_{THH}$, the selectable switch S1 is closed. Since the selectable switch S1 is closed, the differential voltage $V(C_{LV})$ across the second capacitor $C_{LV}$ is equal to the rectified voltage Vbus. At time T1, in response to the differential voltage $V(C_{LV})$ rising to the first threshold voltage $V_{THH}$, the selectable switch S1 is opened. Because there is no net leakage current flowing through the second capacitor $C_{LV}$, the differential voltage $V(C_{LV})$ across the second capacitor $C_{LV}$ is maintained at the level of the first threshold voltage $V_{THH}$. When the differential voltage $V(C_{LV})$ drops below the second threshold voltage $V_{THL}$ at time T3, the selectable switch is closed and accordingly the differential voltage $V(C_{LV})$ is equal to the rectified voltage Vbus from time T3.

In the example of FIG. 5B, leakage current of $C_{LV}$ is accounted while the switch S1 is open and theoretically not conducting. When the differential voltage $V(C_{LV})$ is rising and the differential voltage $V(C_{LV})$ is less than the first threshold voltage $V_{THH}$, the selectable switch S1 is closed, and the differential voltage $V(C_{LV})$ across the second capacitor $C_{LV}$ is equal to the rectified voltage Vbus. At time T1, in response to the differential voltage $V(C_{LV})$ rising to the first threshold voltage $V_{THH}$, the selectable switch S1 is opened. When the selectable switch S1 is opened, the second capacitor $C_{LV}$ may be discharged by its own leakage current. Accordingly, the differential voltage $V(C_{LV})$ across the second capacitor $C_{LV}$ decreases. At time point T2', when the differential voltage $V(C_{LV})$ drops to the second threshold voltage $V_{THL}$, the switch is closed momentarily to charge the second capacitor $C_{LV}$ until the differential voltage $V(C_{LV})$ exceeds the first threshold voltage $V_{THH}$ at time T3'. Similarly, from time T3', the selectable switch S1 is opened and the differential voltage $V(C_{LV})$ starts to slowly decrease again. From time T5', the selectable switch S1 is closed and accordingly the differential voltage $V(C_{LV})$ is equal to the rectified voltage Vbus from time T5'.

Therefore, according to one embodiment of the present invention, the selectable switch S1 and the second capacitor $C_{LV}$ are selectively coupled in parallel with the first capacitor $C_{HV}$. By utilizing a topology that includes the first capacitor $C_{HV}$ and the selectable second capacitor $C_{LV}$, the total physical size of the capacitors is reduced and the size of the power supply is reduced accordingly.

The volume of a capacitor is a function of its capacitance and a square of its voltage rating. An example is discussed for the capacitances of the first capacitor $C_{HV}$ and the second capacitor $C_{LV}$ in the following. It is noted that each of the capacitances $C_{HV}$ and $C_{LV}$ may be realized by one or more individual capacitors.

In the power supply, the rectified voltage Vbus desirably maintains a constant level. Because of imperfect performance, however, the voltage across $C_{LV}$ may decrease while the switch S1 is open due to leakage. Accordingly, voltage levels $V_{THH}$ and $V_{THL}$ are defined to provide hysteresis to prevent excessive switching. In addition, the voltage $V(C_{LV})$ varies between upper and lower peak values that substantially correspond with $V_{THH}$ and $V_{THL}$. When the AC power source 201 is removed or suddenly fails, the DC/DC converter 206 responds to this falling voltage by expanding its duty cycle in order to maintain output voltage regulation. At a certain voltage of the rectified voltage Vbus, the duty cycle reaches its maximum limit and output voltage regulation is no longer maintained. This lowest operating voltage point of the voltage Vbus and the full load rating determine the amount of capacitance needed to satisfy the hold-up requirement.

In order to provide a desired DC voltage signal in different countries, the power supply needs to operate for a wide range of the AC input voltage Vin. For example, in some countries or regions, the amplitude of the AC input voltage Vin is 110 volts while in some others, the amplitude is 220 volts. When the AC input voltage Vin is high enough, only a small capacitance is required to the rectified voltage Vbus from going below a minimum desired value for the DC/DC converter 206. When the AC input voltage Vin is low enough, a large capacitance is required to keep the valley of the rectified voltage Vbus from going below the minimum desired value.

The energy stored in the capacitor $C_{HV}$ when the selectable switch S1 is opened, or energy stored in the capacitors $C_{HV}$ and $C_{LV}$ when the selectable switch S1 is closed, is used to provide the necessary temporary power for the load when the input power source Vin goes out. Take an example that the high input voltage is 220 volts and the low input voltage is 110 volts. In this illustrative example, the capacitance required at the low input voltage to provide for the same amount of hold-up time is roughly four times at the high input voltage. Assuming the capacitance needed for the high input voltage is the capacitance $CAP_{HV}$, so the capacitance needed for the power supply for the low input voltage is 4 times of the capacitance $CAP_{HV}$. Considering the capacitance of the configurable filter 208 equals the sum of the capacitance of the first capacitor $C_{HV}$ and the second capacitor $C_{LV}$ when the switch S1 is closed, the capacitance of $C_{LV}$ is 3 times of $CAP_{HV}$.

As described, when the differential voltage $V(C_{VL})$ is greater than or equal to the first threshold voltage $V_{THH}$, only the first capacitor $C_{HV}$ is operating. When the differential voltage $V(C_{VL})$ is less than or equal to the second threshold voltage $V_{THL}$, both the first capacitor $C_{HV}$ and the second capacitor $C_{LV}$ are operating. Therefore, the first capacitor $C_{HV}$ has a high voltage rating while the second capacitor $C_{LV}$ has a low voltage rating. In this illustrative example, the ratio of the voltage ratings of $C_{HV}$ and $C_{LV}$ is equal to 2:1.

When using a prior art power supply as illustrate in FIG. 1, in order to cover a range from a low input voltage to a high input voltage of Vin, a large capacitance is needed at the low input voltage, and when at the high input voltage, a high voltage rating is needed. Assuming the capacitance, the voltage rating and the volume for a bulk capacitor at the high input voltage Vin are $CAP_{HV}$, VTH and VOL, respectively. Usually, the volume of a capacitor is a function of its capacitance and a square of its voltage rating. So, the volume of the bulk capacitor for the prior art power supply, in order to cover a range from a low Vin to a high Vin, is 4*VOL.

According to the solution of the present invention, the first capacitor and the second capacitor are in parallel connection when the input voltage Vin is low. In combination with the discussion of the capacitances and voltage ratings for the first capacitor $C_{HV}$ and the second capacitor $C_{LV}$, the total volume VOL' of the capacitors required according to the present invention is calculated according to below equation (1):

$$VOL' = VOL_H + VOL_V = \qquad (1)$$
$$VOL + \left[\left(\frac{VTH}{2VTH}\right)^2 * \left(\frac{3CHV}{CHV}\right)\right] * VOL = VOL + \frac{3}{4} * VOL = \frac{7}{4} * VOL.$$

Therefore, in this illustrative example, the volume of the capacitors needed in a power supply is reduced by $$\frac{4VOL - \frac{7}{4}VOL}{4VOL} = 56.25\%$$

In addition, according to one embodiment of the present invention, the differential voltage $V(C_{LV})$ across the second capacitor $C_{LV}$ is sensed and used to generate the control signal Vctrl to open and close the selectable switch S1. Advantageously, the differential voltage $V(C_{LV})$ across the second capacitor $C_{LV}$ is maintained between the first threshold voltage $V_{TTH}$ and the second threshold $V_{THL}$, even when the voltage $Vn(C_{LV})$ at the node connected to the second capacitor $C_{LV}$ and the selectable switch S1 is floating during the time duration in which the selectable switch S1 is opened. Thus, the selectable switch S1 with a relatively low voltage rating can be used in the power supply, which reduces the size of the switch S1 and further reduces the size of the power supply.

Referring back to FIG. 4, the configurable filter 208 further includes a diode D1 coupled in parallel with the selectable switch S1. In an alternative embodiment, the selectable switch S1 has a body diode D1'. The following description takes the diode D1 coupled in parallel with the selectable switch S1 as an example. The operation of D1' is similar to D1.

The waveform of the rectified voltage Vbus depends on the waveform of the AC input voltage Vin. When the selectable switch S1 is opened, the rectified voltage Vbus may drop. Once the rectified voltage Vbus drops to the value of the differential voltage $V(C_{LV})$ across the second capacitor $C_{LV}$, the diode D1 is closed and allows current to pass through the selectable switch S1 in one direction. Accordingly, the differential voltage $V(C_{LV})$ is adjusted or "clamped" to be equal to the rectified voltage Vbus.

For example, in FIG. 5A, the rectified voltage Vbus drops to the value of the differential voltage $V(C_{LV})$ at time T2. Therefore, the differential voltage $V(C_{LV})$ is adjusted to be equal to the level of the rectified voltage Vbus in advance from time T2. Similarly, in FIG. 5B, the differential voltage $V(C_{LV})$ is adjusted to be equal to the level of the rectified voltage Vbus from time T4'.

Figure 6:
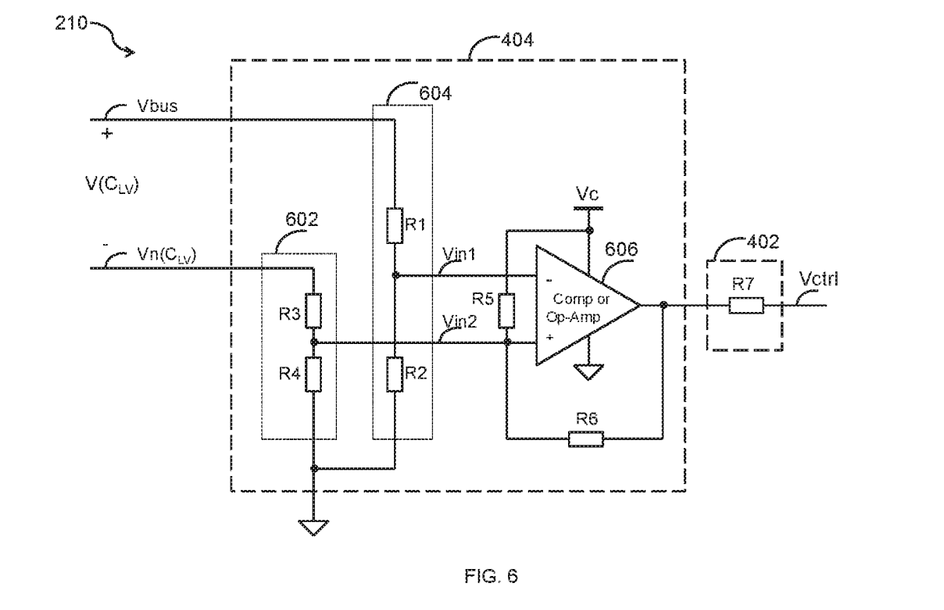
FIG. 6 illustrates a controller, according to one embodiment of the present invention.

FIG. 6 illustrates a comparing module according to one embodiment of the present invention. Elements labeled or numbered the same as in FIG. 4 have similar functions. Commonly labeled or numbered elements won't be described again.

As discussed, the controller 210 includes the comparing module 404 and the signal generator 402. In the example shown in FIG. 6, the comparing module 404 includes a first voltage divider 604, a second voltage divider 602, and a comparator 606 (or an operational amplifier (Op-Amp)). The first voltage divider 604 is coupled to receive the voltage Vbus and generates a first input signal Vin1 indicative of the voltage Vbus. The second divider 606 is coupled to receive the voltage $Vn(C_{LV})$ and generates a second input signal Vin2 indicative of the voltage $Vn(C_{LV})$. The comparator 606 is coupled to receive the first input signal Vin1 and the second input signal Vin2, and compares the first input signal Vin1 and the second input signal Vin2. The signal generator 402 may use an additional drive stage to generate the control signal Vctrl based on the comparison result. As a simplified solution as shown in FIG. 6, a damping resistor R7 is used to connect the output of the comparator 606 and the control signal Vctrl.

More specifically, the first divider 604 includes a first resistor R1 and a second resistor R2 coupled in series for receiving the voltage Vbus. The first divider 604 generates the first input signal Vin1 at a node connected to the first resistor R1 and the second resistor R2.

The second divider 602 includes a third resistor R3 and a fourth resistor R4 coupled in series for receiving the voltage $Vn(C_{LV})$. The second divider 602 generates the second input signal Vin2 at a node connected to the third resistor R3 and the fourth resistor R4.

The comparator 606 has a first input terminal "−", a second input terminal "+" and an output terminal. For example, the comparator 606 can be implemented by a Schmitt trigger. The first input terminal is coupled to receive the first input signal Vin1. The second input terminal is coupled to receive the second input signal Vin2. The second input terminal is further coupled to a supply voltage Vc for the comparator 606 through a resistor R5. Therefore, the resistors R4 and R5 create a reference voltage for the comparator 606.

Hysteresis is introduced by including a resistor R6 coupled between the output terminal and the second input terminal of the comparator 606, to establish the first and second threshold voltages $V_{THH}$ and $V_{THL}$. A threshold hysteresis is $Vthhys = V_{THH} - V_{THL}$. With the hysteresis, the comparison between the differential voltage $V(C_{LV})$ across the second capacitor $C_{LV}$ and $V_{THH}$, $V_{THL}$ is implemented by comparing the first input signal Vin1 and the second input signal Vin2.

In the example in FIG. 6, Vin1 can be obtained according to the equation (2). When the selectable switch S1 is closed, Vin2 can be obtained according to the equation (3). When the selectable switch S1 is opened, a forward conduction voltage Vdio of the diode D1 may be further considered, and Vin2 can be obtained according to the equation (4). For example, Vdio=−0.7 volts.

$$Vin1 = \frac{R2}{R1+R2} * Vbus; \qquad (2)$$

$$Vin2 = R_{3456} * \left(\frac{Vc}{R5} + \frac{Vout}{R6} + \frac{Vn}{R3}\right); \qquad (3)$$

$$Vin2 = R_{3456} * \left(\frac{Vc}{R5} + \frac{Vout}{R6} - \frac{Vdio}{R3} + \frac{Vn}{R3}\right). \qquad (4)$$

R1, R2, R3, R4, R5 and R6 represent the resistance of resistors R1, R2, R3, R4, R5 and R6, respectively. $R_{3456}$ has a value equal to $$\frac{1}{\frac{1}{R3}+\frac{1}{R4}+\frac{1}{R5}+\frac{1}{R6}},$$

that is, $R_{3456}$ represents an equivalent resistance when R3, R4, R5 and R6 are connected in parallel. Vn equals the voltage $Vn(C_{LV})$. Vout represents the voltage at the output terminal of the comparator 606. Vout is equal to a high-level VH or a low-level VL based on the comparison result of the comparator 606.

The operation of the comparing module 404 is described in combination with FIG. 5B.

When the switch S1 is closed, Vin2 is obtained and maintained according to the above equation (3) and the output voltage Vout of the comparator 606 is VH. The voltage level of Vin1 increases when the capacitors are charged. When Vin1 is greater than Vin2, the output voltage Vout of the comparator 606 is switched from VH to VL.

In the example of FIG. 6, the resistances of the resistors satisfy:

$$\frac{R1+R2}{R2} * \frac{R3456}{R3} = 1.$$

Since a difference of the voltage Vbus and the voltage $Vn(C_{LV})$ indicates the differential voltage $V(C_{LV})$ across the second capacitor $C_{LV}$. Therefore, the above comparison when the switch S1 is closed can be derived as the equation (5):

$$V(C_{LV}) = \qquad (5)$$
$$Vbus - Vn > \left(1+\frac{R1}{R2}\right) * R3456 * \left(\frac{Vc}{R5} + \frac{VH}{R6}\right) = \frac{R3}{R5}*Vc + \frac{R3}{R6}*VH.$$

Therefore, the comparing of Vin1 and Vin2 can be equaled to comparing of $V(C_{LV})$ and the first threshold voltage $V_{THH}$. The first threshold voltage has a value of $$V_{THH} = \frac{R3}{R5}*Vc + \frac{R3}{R6}*VH.$$

In response to the output voltage Vout of the comparator 606 switched to VL, the switch S1 is open, and Vin2 is obtained according to the above equation (4). The leak current of the open switch S1 may discharge the second capacitor $C_{LV}$. When Vin1 is less than Vin2, the output voltage Vout of the comparator 606 is switched from VL to VH. Similarly, the comparison when the switch S1 is open can be derived as the equation (6):

$$V(C_{LV}) = Vbus - Vn < \left(1 + \frac{R1}{R2}\right) * R3456 * \left(\frac{Vc}{R5} + \frac{VL}{R6} - \frac{Vdio}{R3}\right) = \quad (6)$$

$$\frac{R3}{R5} * Vc + \frac{R3}{R6} * VL - Vdio.$$

Therefore, the comparing of Vin1 and Vin2 can be equaled to comparing of V(C$_{LV}$) and the second threshold voltage V$_{THL}$. The second threshold voltage has a value of $$V_{THL} = \frac{R3}{R5} * Vc + \frac{R3}{R6} * VL - Vdio.$$

Therefore, according to the comparing module 404 in FIG. 6, the comparison between the differential voltage V(C$_{LV}$) across the second capacitor C$_{LV}$ and V$_{THH}$ V$_{THL}$ is implemented by comparing the first input signal Vin1 and the second input signal Vin2. The controller 210 controls values of the first and second threshold voltages based on a configuration of the first voltage divider 602. For example, the values of the first and second threshold voltages are at least determined based on the resistances of R3, R5 and R6. And the threshold hypothesis is $$Vthhys = V_{THH} - V_{THL} = \frac{R3}{R6} * (VH - VL) + Vdio.$$

It is noted that the controller 210 may have other configurations, and is not limited to the example shown in FIG. 6.

Figure 7:
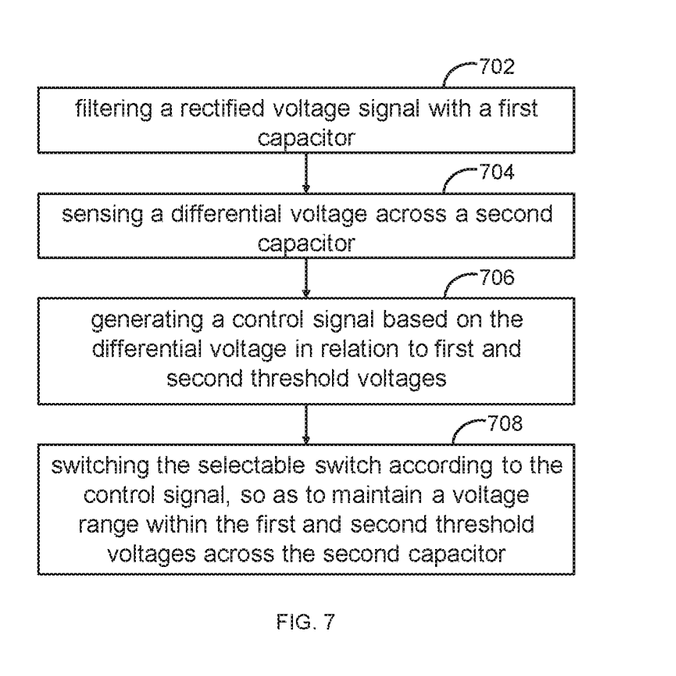
FIG. 7 is a flowchart that illustrates a method for producing a DC voltage according to one embodiment of the present invention.

FIG. 7 is a flowchart 700 that illustrates a method for producing a DC voltage according to one embodiment of the present invention. The method of FIG. 7 should be considered in relation to one or more of the embodiments described in relation to FIGS. 2-6. Although specific steps are disclosed in FIG. 7, such steps are examples. In other words, the embodiments of the invention may include different steps or different combinations of steps and the embodiments are not limited to what is shown in FIG. 7.

In block 702, a rectified voltage signal, e.g., the Vbus, is filtered with a first capacitor, e.g., the capacitor C$_{HV}$. Thereafter, in block 704, a differential voltage V(C$_{LV}$) across a second capacitor, e.g., the capacitor C$_{LV}$, is sensed or measured. The second capacitor is coupled in series with a selectable switch, e.g., the switch S1, and the selectable switch and the second capacitor are selectively coupled in parallel with the first capacitor. After sensing or measuring V(C$_{LV}$), in block 706, a control signal, e.g., the control signal Vctrl, is generated based on the differential voltage across the second capacitor in relation to first and second threshold voltages, e.g., V$_{THH}$ and V$_{THL}$. In one embodiment, in response to the differential voltage across the second capacitor rising to the first threshold voltage, the control signal in a first state, e.g., a low level, is generated and produced to a selectable switch that is connected. In response to the differential voltage dropping to the second threshold voltage, the control signal in a second state, e.g., a high level, is generated and produced to the selectable switch.

In block 708, the selectable switch is switched according to the control signal, so as to maintain a voltage range within the first and second threshold voltages across the second capacitor. In one embodiment, the selectable switch is opened in response to the control signal being in the first state, and is closed in response to the control signal being in the second state.

In one embodiment, the differential voltage may be further adjusted to be equal to the rectified voltage signal if the rectified voltage signal drops below the differential voltage.

While several embodiments have been provided in the present disclosure, it should be understood that the disclosed circuits and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A configurable impedance circuit comprising:
   a filter for filtering a received DC voltage, comprising:
      a first capacitor;
      a second capacitor; and
      a selectable switch coupled in series with the second capacitor and coupled to receive a control signal, wherein the selectable switch and the second capacitor are selectively coupled in parallel with the first capacitor; and
   a controller, connected to sense a differential voltage across the second capacitor and configured to generate the control signal to open or close the selectable switch based on the differential voltage across the second capacitor, so as to maintain a voltage range across the second capacitor, wherein the controller comprises:
      a comparing module, coupled to receive a first voltage signal from a first node connected to the first and second capacitors and to receive a second voltage signal from a second node connected to the second capacitor and the selectable switch coupled in series with the second capacitor, wherein a difference between the first voltage signal and the second voltage signal indicates the differential voltage across the second capacitor; and configured to compare the differential voltage with first and second threshold voltages; and
      a signal generator configured to generate the control signal based on the comparison, wherein the switch is opened whenever the differential voltage is greater than or equal to the first threshold voltage and wherein the switch is closed whenever the differential voltage is less than or equal to the second threshold voltage.

2. The configurable impedance circuit of claim 1, wherein the controller is configured to:
   generate the control signal in a first state to open the selectable switch in response to the differential voltage across the second capacitor rising to a first threshold voltage of the voltage range; and generate the control signal in a second state to close the selectable switch in response to the differential voltage across the second capacitor dropping to a second threshold voltage of the voltage range.

3. The configurable impedance circuit of claim 1, wherein the comparing module comprises:
a first voltage divider coupled to receive the first voltage signal and generate a first input signal indicative of the first voltage signal;
a second voltage divider coupled to receive the second voltage signal and generate a second input signal indicative of the second voltage signal; and
a comparator, coupled to receive the first input signal at a first input end, receive the second input signal at a second input end, and compare the first input signal and the second input signal.

4. The configurable impedance circuit of claim 3, wherein the signal generator is configured to:
adjust the control signal in a first state to open the selectable switch if the first input signal is greater than the second input signal; and
adjust the control signal in a second state to close the selectable switch if the first input signal is less than or equal to the second input signal.

5. The configurable impedance circuit of claim 3, wherein the comparator comprises a Schmitt trigger.

6. The configurable impedance circuit of claim 1, wherein the filter further comprises a diode coupled in parallel with the selectable switch, wherein the diode is configured to adjust the differential voltage to be equal to the rectified voltage signal if the rectified voltage signal drops below the differential voltage.

7. A power supply, comprising:
a rectifier, configured to receive an AC voltage and rectify the AC voltage to produce a rectified voltage signal;
a configurable impedance circuit coupled to receive and filter the rectified voltage signal to produce a filtered DC voltage signal, wherein the configurable impedance circuit comprises:
a first capacitor;
a second capacitor; and
a selectable switch coupled in series with the second capacitor and coupled to receive a control signal, wherein the selectable switch and the second capacitor are selectively coupled in parallel with the first capacitor; and
a controller connected to sense a differential voltage across the second capacitor and configured to generate the control signal to open or close the selectable switch based on the differential voltage across the second capacitor, so as to maintain a voltage range across the second capacitor, wherein the controller comprises:
a comparing module: coupled to receive the rectified voltage signal from a first node connected to the first and second capacitors; and to receive a second voltage signal from a second node connected to the second capacitor and the selectable switch coupled in series with the second capacitor, wherein a difference between the rectified voltage signal and the second voltage signal indicates the differential voltage across the second capacitor; and configured to compare the differential voltage with first and second threshold voltages; and
a signal generator, coupled to the comparing module and configured to generate the control signal base on the comparison, wherein the switch is opened whenever the differential voltage is greater than or equal to the first threshold voltage and wherein the switch is closed whenever the differential voltage is less than or equal to the second threshold voltage; and
a DC/DC converter coupled to receive the filtered DC voltage signal, wherein the DC/DC converter is configured to convert the filtered DC voltage signal from a first DC voltage level signal to a second DC voltage level signal and provide the second DC voltage level signal to a load.

8. The power supply of claim 7, wherein controller is configured to:
generate the control signal in a first state to open the selectable switch in response to the differential voltage across the second capacitor rising to a first threshold voltage of the voltage range; and
generate the control signal in a second state to close the selectable switch in response to the differential voltage across the second capacitor dropping to a second threshold voltage of the voltage range.

9. The power supply of claim 7, wherein the comparing module comprises:
a first voltage divider coupled to receive the rectified voltage signal and generate a first input signal indicative of the rectified voltage signal;
a second voltage divider coupled to receive the second voltage signal and generate a second input signal indicative of the second voltage signal; and
a comparator, coupled to receive the first input signal at a first input end, receive the second input signal at a second input end, and compare the first input signal and the second input signal.

10. The power supply of claim 9, wherein the signal generator is configured to:
adjust the control signal in a first state to open the selectable switch if the first input signal is greater than the second input signal; and
adjust the control signal in a second state to close the selectable switch if the first input signal is less than or equal to the second input signal.

11. The power supply of claim 9, wherein the comparator comprises a Schmitt trigger.

12. The power supply of claim 7, wherein the configurable impedance circuit further comprises a diode coupled in parallel with the selectable switch, wherein the diode is configured to adjust the differential voltage to be equal to the rectified voltage signal if the rectified voltage signal drops below the differential voltage.

13. A method for filtering a rectified voltage signal, comprising:
filtering the rectified voltage signal with a first capacitor;
sensing a differential voltage across a second capacitor, wherein the second capacitor is coupled in series with a selectable switch, wherein the selectable switch and the second capacitor are selectively coupled in parallel with the first capacitor;
generating a control signal based on the differential voltage across the second capacitor in relation to first and second threshold voltages; and
switching the selectable switch according to the control signal, so as to maintain a voltage range within the first and second threshold voltages across the second capacitor;
wherein generating the control signal comprising:
receiving the rectified voltage signal from a first node connected to the first and second capacitors and receiving a second voltage signal from a second node connected to the second capacitor and the selectable switch coupled in series with the second capacitor, wherein a difference between the rectified voltage signal and the second voltage signal indicates the differential voltage across the second capacitor;

comparing the differential voltage with first and second threshold voltages;

generating the control signal base on the comparison, wherein the switch is opened whenever the differential voltage is greater than or equal to the first threshold voltage and wherein the switch is closed whenever the differential voltage is less than or equal to the second threshold voltage.

14. The method of claim 13, wherein generating the control signal comprises:

generating the control signal in a first state in response to the differential voltage across the second capacitor rising to a first threshold voltage of the voltage range;

wherein switching the selectable switch comprises:

opening the selectable switch in response to the control signal being in the first state.

15. The method of claim 13, wherein generating the control signal comprises:

generating the control signal in a second state in response to the differential voltage across the second capacitor dropping to a second threshold voltage of the voltage range;

wherein switching the selectable switch comprises:

closing the selectable switch in response to the control signal being in the second state.

16. The method of claim 13, further comprising:

adjusting the differential voltage to be equal to the rectified voltage signal if the rectified voltage signal drops below the differential voltage.

* * * * *